United States Patent [19]

Cook et al.

[11] 4,197,661

[45] Apr. 15, 1980

[54] EDUCATIONAL TOYS

[75] Inventors: Peter H. Cook, 39 Romer Ave., Lewisham, London, S.E. 13, England; Joseph A. H. Holmes, London, England

[73] Assignees: B & H Commercial Inventors & Designers Limited; Peter Henry Cook, both of London, England

[21] Appl. No.: 772,093

[22] Filed: Feb. 25, 1977

[30] Foreign Application Priority Data

Mar. 9, 1976 [GB] United Kingdom ............... 9390/76
Jul. 12, 1976 [GB] United Kingdom ............. 28962/76

[51] Int. Cl.² .............................................. G09B 1/10
[52] U.S. Cl. ...................................... 35/35 H; 35/9 R
[58] Field of Search .......... 35/9 R, 9 D, 35 R, 35 D, 35/35 H, 35 J, 69, 70, 71, 73

[56] References Cited

U.S. PATENT DOCUMENTS

| 1,085,405 | 1/1914 | Dadd | 35/71 |
|---|---|---|---|
| 1,428,456 | 9/1922 | Stranders | 35/71 |
| 1,539,909 | 6/1925 | Paris | 35/35 R |
| 1,571,488 | 2/1926 | Moisan et al. | 35/35 H X |
| 2,415,342 | 2/1947 | Donner | 35/69 |
| 2,505,230 | 4/1950 | Composto | 35/35 D |
| 2,656,617 | 10/1953 | Composto | 35/9 D |
| 2,839,843 | 6/1958 | Keyko | 35/35 H |
| 3,015,895 | 1/1962 | Stall | 35/35 D |
| 3,389,480 | 6/1968 | Holland | 35/35 H |
| 3,609,877 | 10/1971 | Weinstein | 35/35 H X |
| 3,659,356 | 5/1972 | Nelson | 35/9 D X |
| 3,795,067 | 3/1974 | Weinstein | 35/35 D X |
| 3,813,471 | 5/1974 | Dean | 35/35 H |

FOREIGN PATENT DOCUMENTS

| 2407127 | 10/1974 | Fed. Rep. of Germany | 35/75 |
|---|---|---|---|
| 598044 | 2/1948 | United Kingdom | 35/71 |
| 700095 | 11/1953 | United Kingdom | 35/35 H |
| 934799 | 8/1963 | United Kingdom | 35/35 H |
| 965399 | 7/1964 | United Kingdom | 35/71 |
| 997145 | 7/1965 | United Kingdom | 35/31 D |
| 1021094 | 2/1966 | United Kingdom | 35/35 H |
| 1027982 | 5/1966 | United Kingdom | 35/7 R |

*Primary Examiner*—William H. Grieb
*Attorney, Agent, or Firm*—M. Ted Raptes

[57] ABSTRACT

An educational toy comprising support means arranged or arrangeable to define a plurality of adjacent stations, a supply of elements each bearing at least one character from which elements the solution of a problem represented by the stations can be built up by placement of the elements on respective stations, and co-operating means on the stations and elements, for verifying that a correct element is mounted on any station, characterized in that the supply of elements is divided into a plurality of groups each having a distinctive visible coding and the stations each bear the appropriate group coding, so that an appropriate element can be chosen from a predetermined number of possibilities corresponding to the number of different elements in its group. The support means can consist of a board marked with a device showing the problem and associated means for receiving the elements, and constituting the stations. Alternatively, the support means can consist of reference elements, cryptically marked e.g. on an under-face and being complementary to the character elements. In one embodiment the reference elements are marked with capital letters and the character elements with lower case letters. The groups are preferably coded by color.

11 Claims, 8 Drawing Figures

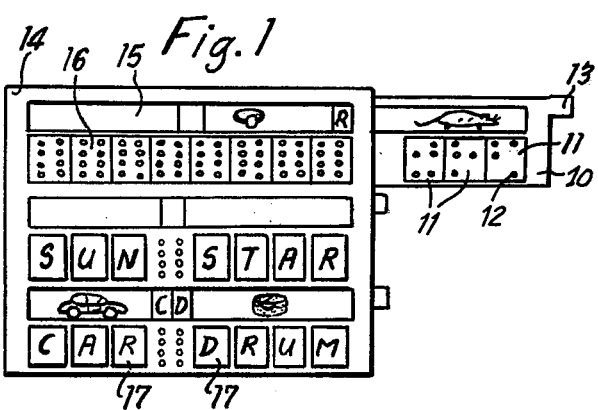
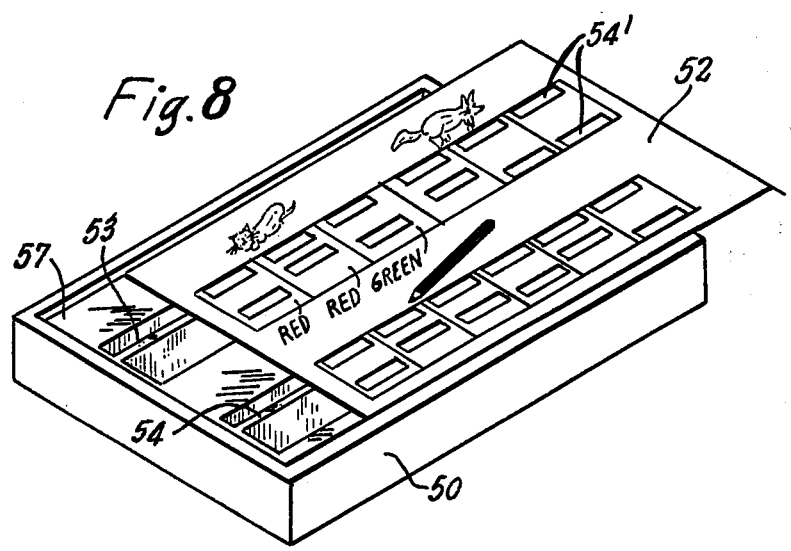

EDUCATIONAL TOYS

This invention relates to educational toys or games and particularly but not exclusively to educational toys for young children learning to read and spell.

PRIOR ART

British Pat. No. 1,021,094 describes an educational toy or teaching aid having support means in the form of a board arranged to receive and support a series of cards or panels. The panels each bear a series of pictures representing words to be spelt, and associated with the pictures a series of stations adapted to receive character elements individually marked with letters spelling out the words. The character elements are square blocks or tiles formed with pegs on their lower surfaces which fit into perforations at the stations, the pegs and perforations being arranged so that only the right letter can be inserted at the right station.

In the toy described all of the letter elements have the same colour. In this situation, the child has no guidance whatsoever apart from the representation of the letter so that the toy is suitable only for fairly advanced children who can readily spell quite well. It is unsuitable for a child at an early age learning to read. On the other hand children of this early age might be expected to benefit to the greatest extent from a spelling toy. The toy is likely to appeal to very young children at this level of ability.

It is virtually impossible to provide 26 different colours by which different letters might be individually identified. U.S. Pat. No. 1,085,405 describes a toy in which letter elements are used each of which has a different peripheral shape, the characters somewhat resembling jig-saw pieces. This arrangement presents virtually no problem in actual spelling since all the child has to do is to find the right piece and place the element in position. This makes actual effort in spelling trivial and the educational value is low.

SUMMARY OF THE INVENTION

This invention is aimed at providing an educational toy which can be adapted especially, although not exclusively, to young children learning to read and which presents a problem in such a form that the child can derive educational value with a carefully controllable degree of difficulty.

In accordance with one form of the invention there is provided an educational toy comprising support means arranged or arrangeable to define a plurality of adjacent stations, a supply of elements each bearing at least one character from which elements the solution of a problem represented by the stations can be built up by placement of the element on respective stations, and co-operating means on the station and elements for verifying that a correct element is mounted on any station, characterised in that the supply of elements is divided into a plurality of groups each having a distinctive visible coding which is not associated with any said problem or its solution and the stations each bear the appropriate group coding, so that an appropriate element can be chosen from a predetermined number of possibilities corresponding to the number of different elements in its group.

The toy may include a supply of letters and also a supply e.g. of numbers. It may include a supply of capital letters as well as lower case letters for example letters in a different script such as German script.

Where the characters are letters it is preferred that there are not less than three and not more than seven letters in each coding group. More preferably, there are four or five in each coding group.

It is a particular advantage for the coding to be by colour since this is the quickest method for the child to appreciate the number of choices. In this case the groups will be of different colour, the stations being appropriately colour coded.

Where there is a supply of numbers these may be divided into two coding groups.

The different elements may have different co-operating means such that only an element of correct character and orientation can be arranged on a particular station. However it is economically advantageous for certain elements of different coding groups to have identical co-operating means. Confusion is not likely to arise and there is considerable economy in that it is not necessary to provide for 26 different interlocking combinations. Furthermore it is advantageous both from the economic point of view and from the child's point of view for the letters S, O and X, which appear the same upside down, to be provided with co-operating means enabling them to be positioned in a normal or inverted orientation.

The co-operating means may comprise interengaging projections and recesses. Thus the projections may be pegs, which can be of advantage where the elements are injection moulded.

In an alternative embodiment to be described the projections are in the form of parallel ridges. This is very advantageous where the elements are to be produced of wood since machinery can be adapted to remove lines of material.

The support means can comprise a board marked with at least one device representing a problem and, associated with the device, a plurality of stations at fixed locations.

However in accordance with the most preferred form of the invention, the support means comprises a supply of reference elements bearing respectively a marking identifying the element and with a said character of the first supply, the marking being in cryptic form as hereinafter defined, co-operating means being provided on the reference elements and character elements, individual to each combination of reference elements and character elements, for verifying that the correct character element is associated with a reference element.

By "in cryptic form" is meant that the mark is of a kind which can be maintained secret from the player but known to a teacher, parent or other person setting a problem to be solved by suitably arranging the visibly marked elements. Thus the mark may be a code the solution of which is provided as part of the toy, or the same letter marked in a position normally hidden from the player e.g. on a side or undersurface of the element, preferably in a smaller size and/or raised inset so as to be the same colour as the rest of the element.

It is particularly useful for the reference elements to be marked on their inverse faces with different forms of letters from the respective complementary character elements. In this situation either supply of letters can be used as "reference elements". The elements of each type of supply can then be of identical shape except at their interengaging surfaces, which will of course be complementary.

Where the two types of elements are utilised, the support means can include a frame arranged for receiving at least one row of reference elements with their inverse faces downwards so that the character elements can be fitted to them. The frame may comprise a groove with means for frictionally receiving the reference elements.

There is provided in accordance with another aspect of the invention an educational toy comprising a first supply of character elements bearing respectively at least one letter or other character, the character being arranged so as to be clearly visible, and a second supply of reference elements bearing respectively a marking identifying the element with a said character of the first supply, the marking being in cryptic form as hereinbefore defined, co-operating interlocking means being provided on the reference elements and character elements, for verifying that the correct character element is associated with a reference element.

BRIEF DESCRIPTION OF DRAWINGS

Embodiments of the invention are hereafter described with reference to the accompanying drawings in which:

FIG. 1 is a plan view of a support means and character elements constituting one embodiment of the invention;

FIG. 2 is a plan view, partly diagrammatic, illustrating how a supply of character elements can be arranged for injection moulding, in accordance with the embodiment of FIG. 1;

FIG. 8 illustrates another form of support means for use with the character elements shown in FIG. 6.

DETAILED DESCRIPTION OF DRAWINGS

Figures 3, 4:
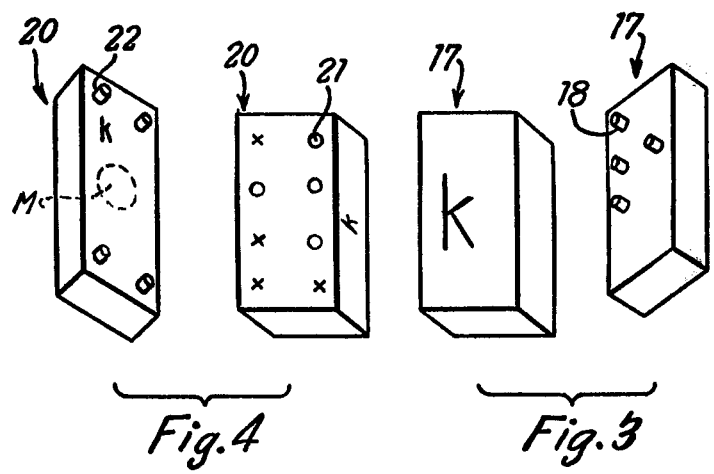
FIG. 3 is a pair of isometric views of one character element.
FIG. 4 is one pair of isometric views of a reference element complementary to the character element of FIG. 3.

Turning to FIG. 1 there is shown a primary support means in the form of a strip card, plastics or other suitable material 10 divided longitudinally into two sections only one of which is shown projecting, the projecting section bearing on the left a device in the form of a picture of a ring and on the right a device in the form of a picture of a rat, the letter R being interposed between the pictures. In a row underneath the picture of the rat there are three stations 11 in the form of rectangular areas marked out with individual patterns of apertures 12. The apertures 12 are arranged to be individual to each of the letters of the alphabet and are selected in four positions out of a total possibility of eight positions in two vertical columns of four. The slide 10, which is furnished with a tab 13 is arranged to slide within a suitable recess in a frame 14 constituting a primary support means. The primary support means 14 has an elongate longitudinal aperture 15 aligned with the devices of each of the two sections of the slide 10. Underneath each section are positions 16 aligned with each of the four possible stations under each of the two picture spaces 15. It will be appreciated that only three of these stations are utilised to spell the word rat. The positions 16 contain apertures corresponding to the complete two rows of four possible positions for receiving pegs to be described. They are positioned so that when the slide 10 is properly inserted the apertures 12 are aligned with certain selected apertures in each position 16.

The toy additionally includes a supply or font of letter elements 17. A K element is illustrated in FIG. 3. This may be a rectangular prismatic block or tile e.g. of plastics material, provided with pegs 18 in appropriate positions for insertion into corresponding stations 11.

The frame 14 of FIG. 1 contains recesses for three different slides making up a total of six different pictures to be spelt out of three or four letter words. Thus the words SUN, STAR, CAR and DRUM are shown correctly spelt out by a child. As illustrated in FIG. 1, each picture may also incorporate the first letter as an additional clue to the child.

It will be appreciated that instead of having three slides sliding into the frame, it would be perfectly possible to arrange the frame to receive single cards either sliding in as illustrated or placed over the top, similarly to the embodiment of FIG. 8 to be described.

In accordance with the invention the supply of letter elements is divided into groups of different coloured elements so that the child has to select e.g. from four or five different letters having the same colour. In this way the child can be given a problem of controlled complexity. Through use of the pegs and apertures, the child has a system for readily checking when he has found the right letter.

A further advantage of the use of the same colour or equivalent marking for a predetermined number of letters or other characters is that it facilitates greatly the manufacture of the toy. It also allows toys differing degrees of difficulty to be assembled by varying the predetermined number of possibilities from which the appropriate element is to be chosen. Thus if for example a different colour were to be used for each of the letters of the alphabet, this would involve twenty-six different colours, which is a virtual impossibility. Other forms of marking would therefore have to be adopted instead of or in addition to colour marking and the toy would be difficult to manufacture. By means of the invention it is possible to use a convenient number of colours which can be chosen to differ greatly one from the others. The preferred number of colours is six. The colours may be arranged to take account of the frequency of occurrence of particular letters in the language concerned. Since the letters 'e' and 't' occur most frequently, they will be necessary in the font of letters in greater numbers than other letters such as 'z' and 'q'. Thus it is preferred to have two letters adjacent to each other in the scale of frequency of use, of a different colour. In other words to have 'e' of a different colour from 't'. This is of more importance with letters which are most frequently used.

At the same time, to assist manufacture and to allow for an aesthetic presentation, the colours should be so far as possible distributed in equal numbers throughout the whole font of letters provided. At the same time care must be taken to arrange that any one colour is not used for too many letters thereby altering the difficulty of the problem to the child.

An appropriate scheme, suitable for children of about 4 years of age learning to read would be as follows:

| Green: | K | N | V | I | D |
|--------|---|---|---|---|---|
| Orange: | E | G | X | M | |
| Blue: | P | A | Y | H | |
| Pink: | J | S | Z | F | L |
| Red: | T | U | Q | C | |
| Yellow: | R | W | O | B | |

The above scheme provided four or five letters on each colour. In general it is preferred that there should be not less than three letters on a colour and not more than seven.

In a similar manner it is possible to use two colours for numbers e.g.

| Brown: | 2 | 4 | 6 | 8 | 0 |
|--------|---|---|---|---|---|
| Mauve: | 1 | 3 | 5 | 7 | 9 |

It will be evident that the particular colours outlined in the scheme above may be individually varied according to preference. Similarly, if it is preferred to use some other form of marking rather than or in addition to different colours, this could obviously be used. Nevertheless, there is a particular advantage where small children are concerned, in adopting bright colours which differ individually to a marked degree.

FIG. 2 shows in plan view an injection moulding providing forty-two elements 17, each differing individually.

It is envisaged that the toy would have two such complete mouldings with the elements connected together by the injection moulding spigots as shown, providing a complete font of eighty-four different elements. The mouldings would be disassembled by breaking off the individual elements before use. In the drawing the dots 18 represent pegs which may be considered projecting downwards through the plane of the paper.

They may however, in accordance with an alternative arrangement be represented by holes. In this case the stations may have dots of appropriate colour in positions adapted to fail in register with the appropriate holes. The letters will be arranged so that the holes do not obscure the letter. With the arrangement shown, with the holes well spaced apart, there should be no interference.

The pegs 18, where used, are arranged as shown so as to distribute them as far as possible over the surface of the element to provide stability when mounted. Each element has four pegs in positions selected from a total possibility of eight, i.e. two vertical rows of four as appearing in the drawing. In the top left-hand element of the moulding shown in FIG. 2 the unused positions are marked with crosses. The appearance of the element K, on its top face, is shown enlarged at the top of the drawing. A black line is indicated under each letter to indicate to the child the correct orientation.

The full peg or hole coding is shown in the moulding with the appropriate letter above each element. The system provides that a complete font of colours will involve two mouldings, although only one mould is necessary. On one of the mouldings the letters will appear as shown unbracketed on the left-hand side of each element in the drawing. The other moulding will appear with the letters shown in brackets on each element, but in inverted relation with respect to the letters indicated on the left of each element. This means that the coding of pegs is individual to each letter. The colours may correspond to the colours tabulated above. The colours are marked opposite each peninsular of the moulding, all the colours of one peninsular being the same. The colours indicated in brackets are those of the second moulding employing the letters marked in brackets. The scheme allows for uniform application of colour to each of the penisulars and this may be done e.g. by spray painting each peninsular appropriately. The letters may thereafter be applied by stencil. Alternatively pre-printed sheets or transfers may be adhered over each peninsular.

The scheme also allows, if this is desired, for the moulding to be divided into three individual mouldings one for each peninsular. In this case, a pigmented moulding compound of the appropriate colour may be used for each peninisular and the font will contain six different peninsulars corresponding to the six different colours. It will be appreciated that this alternative would not involve additional capital expenditure on moulding equipment but would increase the number of moulding steps although this would be offset by the avoidance of the necessity to paint the peninsulars and the only remaining step would be the indication of the letters by stenciling or transfer or adherence of labels and the indication of the orientation e.g. the black line.

It will be apparent that numerals could be constructed in the same way. For example all of the numerals one, two, three, four, five, six, seven, eight, nine, zero could be produced on a single mould. There being two mouldings made one containing the numerals two, four, six, eight, zero and the other e.g. one, three, five, seven, nine. These numerals could be provided in the same toy as the letters, since the possibilities of arranging the pegs have not been exhausted by the letters.

It will be evident that if a larger font or stock of letters is desired, this can readily be made by extending the length of each peninsular as shown in the drawing. Since the most common letters occur in the right-hand vertical column, an extension of each peninsular by two elements each being identical with the right-hand most element in each peninsular as shown in the drawing, a total font of one hundred and eight elements could be provided with an appropriate distribution of the letters.

It will be appreciated that instead of using pegs projecting from the plane of each element, mechanical coupling may be arranged by providing tabs projecting in the plane of the elements e.g. two rows of tabs respectively at the top and bottom of each element. The element should in this case be sufficiently wide to accommodate a possibility of four tab positions at each appropriate edge. The number of tabs may be decreased by making the tabs of different shapes or widths. They might resemble jig-saw tabs.

Another possible variation is instead of having on the support a complete pictorial view representing a word to be built up, there may be provided above each station a pictorial view of a common object whose first letter is the letter to be placed in position. This might be used to build up words which are incapable of pictorial representation, such as the word "laugh". This may be indicated by a view of a log above the station corresponding to L, a view of an apple above the station corresponding to A, a view of an umbrella above the station corresponding to U, a view of a gun opposite the station corresponding to G and a view of a house opposite the station corresponding to H.

Another form of primary support means is shown in FIG. 4. This takes the form of a reference element or adaptor piece. The piece shown is marked on its undersurface with a small letter k and is arranged for receiving the character element k of FIG. 3.

The reference element 20 shown in FIG. 4 has recesses 21 in its upper surface as shown on the right-hand side, in positions to receive the pegs 18 of the character elements K of FIG. 1. As shown in the right-hand element of FIG. 4, the K may be indicated upon the side of the reference element if it is impossible or inconvenient to mark it on the bottom surface. If desired, blank reference elements, identifiable as such e.g. by colour, may be used at the end and/or beginning of a word or problem to hide the marking of the other pieces. As shown on the left-hand side of FIG. 4 four pegs 22 are provided at the corner positions of the two columns of possible positions. If desired all of the possible eight positions may be formed with pegs or any number of pegs may be provided so as to give adequate support for the adaptor piece when attaching it to a secondary support such as the board 23 shown in FIG. 5.

As an alternative, the broken line indicated at M indicates the position of a magnet which could be used with a support member in the form of a ferrous metal sheet.

Figure 5:
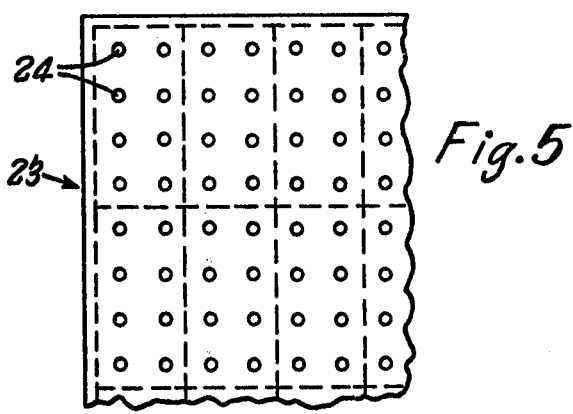
FIG. 5 is a plan view of a secondary support means on which reference elements according to FIG. 4 may be mounted.

The support member shown in FIG. 5 is a board or moulding formed with uniformly distributed recesses or holes 24 for receiving the pegs 22, so as to allow a reference element to be mounted in any desired position. Naturally the distance of the pegs from any edge of the reference element (as indicated in broken lines in FIG. 5) should be the same as or less than the distance between the pegs so as to allow two reference elements to be arranged in juxtaposition on the board.

The size and distribution of the recesses of the board may correspond also to the size and distribution of the pegs 18 of the character elements to allow the elements to be mounted straight onto the board if desired, but this is not necessary.

Naturally some or all of the pegs of the embodiment of FIGS. 3 to 5 may be replaced by recesses and the recesses by pegs. The same result will essentially be achieved except that it will not be possible to arrange the character elements of FIG. 3 directly upon the board of FIG. 5. However, use of the board 23 is for convenience; it is not essential.

In the embodiment of FIGS. 3 to 5, the teacher or person setting the problem will arrange the reference elements upon the board 23 in the appropriate order and present the child with the problem as a separate entity e.g. by pointing to a picture of a fish in a book or on a card. The child then has to spell out the appropriate word using the character elements and fitting them to the reference elements, helped by the colour coding if this is provided.

It will be appreciated that in this embodiment of the invention almost an infinite number of words can be made up. The toy may then be played with as a game or used by adult pupils e.g. when learning a foreign language, in which case it may be desirable not to employ any colour coding to simplify the problem.

Naturally the invention is open to numerous modifications. The reference elements and character elements need not fit together or be mounted one to another so long as some association is evident to the child. Thus they may fit side-by-side and interengage suitably. Some form of electronic co-operating means may be provided to show the child that the correct character element has been found. For example a correctly positioned character element may complete an inductively or conductively coupled circuit to provide some kind of signal such as a lit lamp when the correct character element has been positioned.

Although it is preferred that the mechanical (or electronic) interconnection between a character element and a reference element is individual to the character, for ease of manufacture a group of characters may have the same mechanical or electronic interconnection. Some other means will then have to be employed to differentiate the characters of the group so that the child or other player knows when the correct character element has been positioned. One suitable way of doing this would be to have all of the character elements (and reference elements) of one mechanically similar group of different colour. Thus six elements may be moulded upon the same mould but each utilising a different coloured pigment. In this way not more than five letters need be of the same colour, for a twenty-six letter alphabet. In other words the number of moulds could be restricted to five instead of twenty-six, assuming that individual moulds are used. This depends upon the type of tooling and moulding desired. It is of course preferred for each character to have an individual form of coupling to its reference element and this of course will be necessary if a uniform colour is to be adopted.

Figure 6:
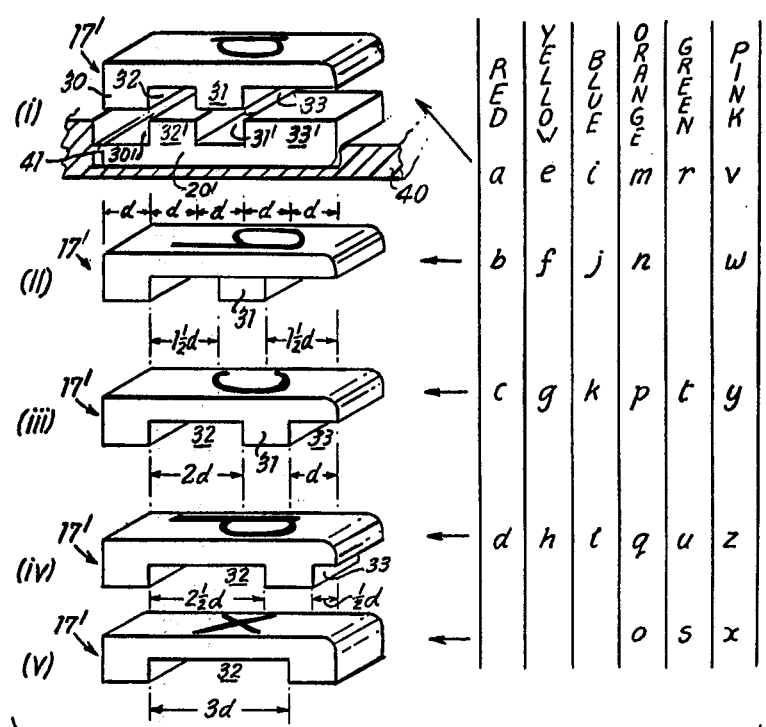
FIGS. 6(i) to (v) illustrate complementary pairs of reference elements and character elements and their fitment into a secondary support, showing one arrangement of colour coding.
Figure 7:
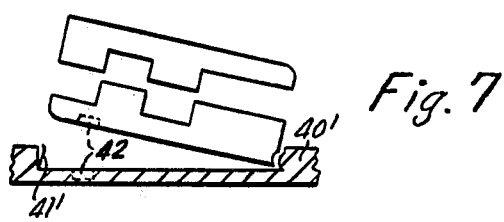
FIG. 7 illustrates in side sectional view an alternative shape for the complementary elements and secondary support.

FIGS. 6 to 8 illustrate yet another embodiment which is suitable for manufacture in wood. In this way a relatively simple form of a toy can be constructed for use with very small children. Wood lends itself to the production of straight line grooves and projections which can be formed quite simply in wooden blocks upon a machine. The linear grooves and projections which can be arranged to interlock, can be scraped out of a single length of wood by mechanical grinder and then the wood cut to an appropriate outline. The use of linear grooves and projections restricts the number of variations possible and in the embodiment of FIGS. 6 to 8, this has been restricted to a minimum of five different shapes for character elements and five complementary shapes for reference elements. These shapes are shown respectively at FIG. 6(i) to FIG. 6(v), the character elements being indicated at 17' and the reference elements 20'. However only one reference element is illustrated, it being apparent that the remaining necessary reference elements will complement the character elements shown.

There are thus five different mechanical groups of letters, and there are also six different coloured groups. FIG. 6 illustrates how the letters of the complete alphabet are to be distributed as regards the mechanical groups and the colour groups. Thus in FIG. 6(i) there will be a red A, a yellow E, a blue I, an orange M, a green R, and a pink V.

Correspondingly in the mechanical group of FIG. 6(ii), there will be a red B, a yellow F, a blue J, an orange N, and a pink W. In the mechanical group of FIG. 6(iii) there will be a red C, a yellow G, a blue K, an orange P, a green T and a pink Y. In the mechanical group of FIG. 6(iv) there will be a red D, a yellow H, a blue L, an orange Q, a green U, and a pink Z.

The mechanical group of FIG. 6(v) differs from the others in that the block has inverse symmetry, the mechanical group being utilised for the symmetrical letters O, S and X. These will of course have different colour and as illustrated O is orange, S green and X pink. These blocks or elements can be fitted in one orientation or upside down, upon a reference element.

It is particularly convenient if the character elements are marked on their plane surfaces in lower case and the reference elements are marked on their plane surfaces with capital letters. There is in this case no real distinction between the reference elements and character elements. The teacher may arrange a word using one set and instruct the child to utilise the other set. If necessary the child can be instructed to start the word with a capital letter. This may be of particular advantage in the case of nouns in the German language.

FIG. 6 illustrates how the interlocking grooves and recesses are arranged. All of the character elements 17' have a pair of parallel ridges 30 and 31 extending across the width of the element and separated by a groove 32. On the right-hand side of ridge 31 is a recess 33 extending to the bottom edge of the element. In the reference element which will be marked A and which is shown in FIG. 6(i) there is a recess 30' extending from the upper edge of the element complementary to ridge 30, a ridge 32' complementary to the groove 32, a groove 31' complementary to the ridge 31 and a projection 33' extending to the bottom edge of the element and complementary to the recess 33.

In all of the elements the ridge 30 and recess 30' remain the same in size and position, being of a width d which is the basic unit. Likewise, all of the ridges 31 and complementary grooves 31' are also of width d, but these alter in position from one letter to the next. Thus in FIG. 6(ii) the groove 32 is shown extended by ½d to a total width of 1½d, the recess 33 being correspondingly reduced from a width 2d in a FIG. 6(i) to a width of 1½d in b FIG. 6(ii) which in effect means that the ridge 31 has been displaced to the right by a distance ½d. In FIG. 6(iii) the letter element c is shown having a recess 32 of dimension 2d and a recess 33 of dimension d, ridge 31 having been displaced to the right by a distance of d with respect to reference letter a. In FIG. 6(iv) the recess 32 is of width 2½d and the recess 33 of width ½d. In FIG. 6(v), the recess 32 is of width 3d and the recess 33 has disappeared, leaving a symmetrical element for use with the letters O, S and X. It will be apparent that the reference elements marked with capital letters are complementary to the character elements shown.

Although the elements may be used in the toy on their own without further support, it is particularly convenient to utilise a support which may be for example a block of wood containing one or more grooves of a width equal to the height or lengthwise dimension of the elements so that the elements can be arranged conveniently in a row as illustrated in FIG. 6(i). To keep the elements firmly in the groove, one edge of the groove in the secondary support 40 is provided with a resilient strip 41 which may be constituted by e.g. rubber, foam plastics or flanged metal strip as shown for example at 41' in FIG. 7. The elements may be eased into the groove by inserting the upper end against the resilient strip 41 and pressing in the lower end and to ease this, the corners formed between the lower edges and the planar faces may be chamfered as shown. The top end of the groove in the secondary support may be as shown in FIG. 6(i) of a height equal to a pair of combined units but it is convenient for fitting if the lower edge of the groove is at a lower level.

A modification of this embodiment is shown in FIG. 7 in which the corners between the plane faces and the front edges of the elements are chamfered and a curved recess is provided in the opposite corner complementary to a curved edge to the groove in the secondary support 40'. Magnet elements 42 may be provided to hold the elements in position alternatively to or in addition to the resilient strips 41, 41'.

An alternative form of secondary supporting means is shown in FIG. 8 consisting of a board 50 containing a recessed ledge 51 for receiving one of a series of cards or panels 52 which may be arranged generally as shown in FIG. 1 with devices, legends or pictures showing the problem to be solved and apertures 54' underneath the pictures at appropriate stations for receiving the projections of elements as shown in FIG. 6. In order to support the cards or panels 52 more securely in use, the spaces under the cards or panels which are not required to be empty in order to receive a projection of one of the character elements can be filled in as shown. Thus intervening supporting ridges 53 and 54 may extend lengthwise in positions which will never receive a projection.

The following are examples of games which may be sold containing different combinations of integers.

Game 1

This may contain twenty-six lower case letters plus a set of pictorial cards of the type shown in FIG. 8.

Game 2

This may consist of twenty-six lower case letter elements and a further twenty-six capital letter reference elements together with a grooved board of the type shown in FIG. 6.

Game 3

This may consist of the letters of Game 2 together with additional letter elements and reference elements for example a second complete alphabet less X, Q, and Z and in addition an extra A, E, T, and S.

Game 4

This may consist of a game as in Game 2 or Game 3 together with three sets of number elements which may be divided into two groups e.g. brown coloured, 0, 2, 4, 6, 8 and mauve coloured 1, 3, 5, 7, 9. There would also be included appropriate reference numbers which could either be marked cryptically as in FIG. 4 or e.g. with Roman numerals.

Any of Games 2, 3, and 4 could also include spacer blocks for use in spacing between words and at the beginning and ends of words. Preferably the letters are differently coloured as between capitals and lower case letters. For example the lower case letters may be white and the capital letters black. It will be appreciated that the embodiment of FIG. 6 could also be made in plastics and the use of equivalent moulds for letters of different colour could be utilised in the same way in embodiments constructed of pegs. It will further be appreciated that Game 1 will require only five different individual moulds for injection moulded elements. Games 2, 3 and 4 will require only ten.

What is claimed is:

1. An educational toy comprising:
   (a) a supply of elements each bearing a single letter on its front face and having on its rear face an interlocking means specific to the element;
   (b) support means having individual stations for receiving the elements in interlocking relationship, the stations being either pre-arranged as a word or being present on individual reference elements which can be arranged as a word, whereby only correctly chosen letter elements can be interlockingly engaged so as to spell the word, characterized in that the front faces of the letter elements are identical except for the marked letter and the colour, the supply of letter elements being divided into differently coloured groups there being not less than three and not more than seven letter elements in each colour group, and the stations of the support means having the appropriate letter colour, whereby an appropriate letter element can be chosen from a predetermined number of possibilities corresponding to the number of letter elements having the same colour.

2. An educational toy according to claim 1 wherein the different elements have different co-operating means such that only an element of correct character and orientation can be arranged on a particular station.

3. An educational toy according to claim 1 wherein certain elements of different coding groups have identical co-operating means.

4. An educational toy according to claim 1 wherein the co-operating means comprise interengaging projections and recesses.

5. An educational toy according to claim 4 wherein the projections are pegs and wherein the elements are injection moulded.

6. An educational toy according to claim 4 wherein the projections are parallel ridges.

7. An educational toy according to claim 8 wherein the elements are of wood.

8. An educational toy according to claim 1 wherein the support means comprises a board marked with at least one device representing a problem and, associated with the device, a plurality of said stations in fixed locations.

9. An educational toy according to claim 1 wherein the support means further includes a frame arranged for receiving at least one row of reference elements with their inverse faces downwards so that the character elements can be fitted to them.

10. An educational toy according to claim 9 wherein the frame comprises a groove with means for frictionally receiving the reference elements.

11. An educational toy comprising:
 (a) a supply of elements each bearing a single letter on its front face and having on its rear face an interlocking means specific to the element;
 (b) support means having individual stations for receiving the elements in interlocking relationship, the stations being either pre-arranged as a word or being present on individual reference elements which can be arranged as a word, whereby only correctly chosen letter elements can be interlockingly engaged so as to spell the word, characterized in that the front faces of the letter elements are identical except for the marked letter and the colour, the supply of letter elements being divided into differently coloured groups and the stations of the support means having the appropriate letter colour, whereby an appropriate letter element can be chosen from a predetermined number of possibilities corresponding to the number of letter elements having the same colour, and wherein the support means comprises a supply of reference elements identified on their inverse faces with letters respectively identifying each reference element with a corresponding letter bearing element.

* * * * *